3,500,401
RADAR DETECTION DEVICE
Gerald O. Miller and Denman R. Elliott, China Lake, Calif., assignors to the United States of America as represented by the Secretary of the Navy
Filed July 15, 1968, Ser. No. 745,657
Int. Cl. H01s 7/36; H04b 1/22
U.S. Cl. 343—18     2 Claims

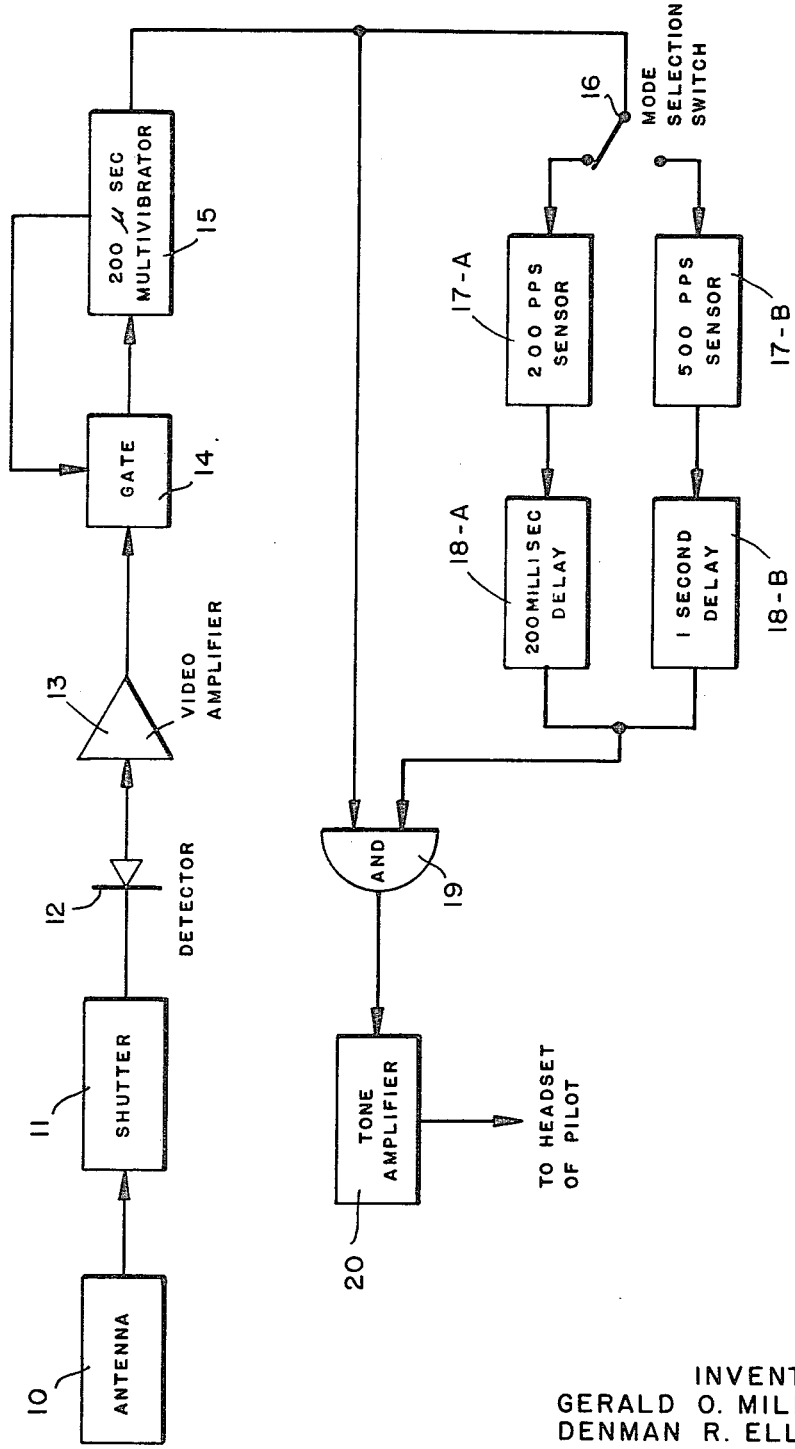

ABSTRACT OF THE DISCLOSURE

A detector for indicating the presence or absence of pulsed tracking radars wherein presence is indicated by an audible tone having a frequency proportional to the pulse repetition frequency of the tracking radar.

BACKGROUND OF THE INVENTION

Photo-reconnaissance aircraft presently operating in hostile environments basically depend upon visual observation to avoid radar directed defenses. Alternate warning means include stand-off electronic warfare aircraft which provide radio warnings and simple hand held radar emission detectors. These warning methods are undesirable because they require additional pilot attention, reduce reaction time, and under certain spatial conditions leave the pilot without adequate coverage.

It is desirable, therefore, to have a device permanently installed aboard an aircraft capable of providing warning against all threats within lethal range of the aircraft without placing too large a burden on the pilot.

SUMMARY OF THE INVENTION

In accordance with the present invention, radio frequencies (RF) are received by an antenna and detected by a crystal diode. Signals from the detector are amplified and fed to a monostable multivibrator via a gate. Each time a pulse passes through the gate to trigger the monostable multivibrator, the gate is blocked, by a feedback loop from the multivibrator, for 200 microseconds. Pulses that arrive at the gate during this 200 microsecond period are rejected, thus limiting the output of the multivibrator to a maximum pulse density of 5,000 pulses per second.

The output of the multivibrator is simultaneously applied to an AND gate, and a pulse sensing and timing circuit which enables the AND gate. The pulse sensing and timing circuit has two different modes. The first mode requires more than 200 pulses per second during any 200 millisecond period and the second mode requires more than 500 pulses per second for a one second period to produce an enabling signal.

When the AND gate is enabled, the output of the multivibrator is connected directly to a tone amplifier which amplifies the signal to produce a tone to indicate the presence of tracking radar.

BRIEF DESCRIPTION OF THE DRAWING

The single figure is a block diagram of a preferred embodiment of the invention.

DESCRIPTION OF THE PREFERRED EMBODIMENTS

Referring to the drawing, antenna 10 receives pulses from a tracking radar station. The pulses pass through a shutter 11 to a crystal detector 12. Shutter 11 closes upon operator energization of the device to prevent detector 12 from burning out when the device is exposed to large amounts of radio frequencies (RF) energy, such as when the device is aboard an aircraft carrier.

Crystal detector 12 feeds the pulses received from antenna 10 to a video amplifier 13, and the amplified pulses next pass to a gate 14.

The first pulse arriving at gate 14 will pass through to trigger monostable multivibrator 15. The output of monostable multivibrator 15 is fed back to gate 14 to close the gate for 200 microseconds. Pulses arriving at gate 14 during the 200 microsecond period which it is closed will be blocked. Therefore, a signal having a maximum frequency of 5 kilocycles will be produced at the output of monostable multivibrator 15.

The output of multivibrator 15 passes through an enabled AND gate 19 to drive a tone amplifier 20. The tone amplifier produces a signal which in turn produces an audible tone in the headset of a pilot.

AND gate 19 is enabled by a pulse sensing and timing circuit comprising mode selection switch 16, 200 pulse per second sensor 17–A, 200 millisecond delay 18–A, 500 pulse per second sensor 17–B and one second delay 18–B. The pulse sensing and timing circuit is capable of two modes of operation which are chosen by mode selection switch 16 having an upper and lower switching position.

In the first mode, the mode selection switch is placed in the upper position. Pulse sensor 17–A will be activated when the pulse repetition frequency of the tracking radar exceeds 200 pulses per second.

Pulse sensor 17–A is comprised of an integrator in combination with a relay. Pulses received from monostable multivibrator 15 are stored, increasing the D.C. level at the output of the integrator. When a D.C. level, corresponding to 200 pulses per second, is reached, the relay operates to output a pulse sensing signal which is fed to delay 18–A.

Delay 18–A, which is comprised of an RC time delay network coupled with a Schmitt trigger, prevents the pulse sensing signal from enabling AND gate 19 for 200 milliseconds. The RC time delay has a time constant of 200 milliseconds. Therefore, to fire the Schmitt trigger which enables AND gate 19, the pulse sensing signal received from pulse sensor 17–A must exist for longer than 200 milliseconds. If there is a break in the pulse sensing signal, AND gate 19 will be disabled, and a pulse sensing signal having a duration greater than 200 milliseconds must appear at the input to delay 18–A.

Thus, if pulses having a pulse repetition frequency of 200 pulses per second or more are received for longer than 200 milliseconds, AND gate 19 will be enabled, and tone amplifier 20 will prodluce an audible tone in the headset of a pilot.

In the second mode, the mode selection switch is in the lower position. A signal having a pulse repetition frequency greater than 500 pulses per second and having a second duration is required to enable AND gate 19. The second mode is used when flying into high radar concentration areas to prevent non-tracking radars from being heard.

The device will permit an aircraft pilot to know when his aircraft is being tracked by a pulsed radar. Familiarization with target pulse rate characteristics will permit friend or foe target classification.

The invention described herein may be manufactured and used by or for the Government of the United States of America for governmental purposes without the payment of any royalties thereon or therefor.

What is claimed is:
1. A system for detecting the presence of pulsed radio frequencies (RF) energy comprising:
    antenna means for receiving radio frequencies;
    crystal detection means for detecting said frequencies;
    means for converting the detected radio frequencies into a signal capable of producing an audible tone;
    said means for converting further including;

a gate in series with a monostable multivibrator, and a feed back loop from the output of said monostable multivibrator to close the gate during the period of operation of said monostable multivibrator;

a tone amplifier operatively connected to said means for converting; and enabling means connected to said tone amplifier wherein; said enabling means are responsive to the pulse repetition frequency and duration of the detected radio frequencies and said tone amplifier produces an audible tone.

2. The system of claim 1 wherein the enabling means for said tone amplifier comprises:

a AND gate having inputs thereto;

one of said inputs comprising the output of said monostable multivibrator;

another of said inputs comprises the output of a pulse sensing circuit;

said pulse sensing circuit comprising;

a pulse sensor which sums up the output pulses produced by the monostable multivibrator and produces an output pulse in response to a preselected DC level being reached in said pulse sensor, and a time delay network which delays the output of said pulse sensor a preset time.

References Cited

UNITED STATES PATENTS 3,061,795    10/1962    Byrd et al. _____ 325—325 X
3,094,663    6/1963    Siegel _____ 343—18

RODNEY D. BENNETT, JR., Primary Examiner

BRIAN L. RIBANDO, Assistant Examiner

U.S. Cl. X.R.

325—364